United States Patent
Toche

(10) Patent No.: US 11,832,163 B2
(45) Date of Patent: Nov. 28, 2023

(54) METHOD FOR THE AUTOMATIC CONFIGURATION BY AUDIO CHANNEL OF A WIRELESS DEVICE

(71) Applicant: SAGEMCOM BROADBAND SAS, Rueil Malmaison (FR)

(72) Inventor: Clément Toche, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 288 days.

(21) Appl. No.: 17/299,569

(22) PCT Filed: Dec. 3, 2019

(86) PCT No.: PCT/EP2019/083378
§ 371 (c)(1),
(2) Date: Jun. 3, 2021

(87) PCT Pub. No.: WO2020/114994
PCT Pub. Date: Jun. 11, 2020

(65) Prior Publication Data
US 2022/0060972 A1 Feb. 24, 2022

(30) Foreign Application Priority Data
Dec. 5, 2018 (FR) ...................................... 1872398

(51) Int. Cl.
*H04W 48/08* (2009.01)
*H04W 12/50* (2021.01)
*H04W 12/043* (2021.01)

(52) U.S. Cl.
CPC ......... *H04W 48/08* (2013.01); *H04W 12/043* (2021.01); *H04W 12/50* (2021.01)

(58) Field of Classification Search
None
See application file for complete search history.

(56) References Cited

U.S. PATENT DOCUMENTS

| 8,224,246 | B2 | 7/2012 | Suumaki et al. | |
| 10,548,069 | B2 * | 1/2020 | Milham | H04W 48/16 |
| 11,582,606 | B2 * | 2/2023 | Li | H04L 63/101 |
| 2018/0132298 | A1 | 5/2018 | Birnam et al. | |

FOREIGN PATENT DOCUMENTS

| CN | 108718460 A | 10/2018 |
| EP | 3065486 A1 | 9/2016 |
| WO | 2015/100616 A1 | 7/2015 |

OTHER PUBLICATIONS

Mar. 6, 2020 International Search Report issued in International Patent Application No. PCT/EP2019/083378.

* cited by examiner

Primary Examiner — Hong S Cho
(74) Attorney, Agent, or Firm — Williams Mullen; R. Brian Drozd

(57) ABSTRACT

A method for automatically configuring a new electronic device for connecting to a wireless access point of a communication network; initially the audio channel for communication between the new electronic device and one or more electronic devices already connected to the network is established; secondly, the configuration parameters for connecting to the wireless access point are transmitted by this audio channel to the new electronic device, the latter then being able to configure itself correctly in order to connect to the wireless access point of the network.

11 Claims, 3 Drawing Sheets

METHOD FOR THE AUTOMATIC CONFIGURATION BY AUDIO CHANNEL OF A WIRELESS DEVICE

TECHNICAL FIELD

The present invention relates to the field of communication networks comprising at least one wireless access point conforming to one of the IEEE 802.11 standards (Institute of Electrical and Electronics Engineers), that is to say the field of communication networks usually referred to as Wi-Fi networks. The present invention relates more particularly to a method for automatically configuring an electronic device to connect to a wireless access point of such a communication network.

PRIOR ART

A communication network (hereinafter "network") comprising a wireless access point conforming to one of the IEEE 802.11 standards typically comprises a plurality of electronic devices or nodes. Among these electronic devices, some are thus wireless access points (WAPs) allowing a wireless connection of other electronic devices—then referred to as client electronic devices—to the network. The wireless connection of a new client electronic device to the network requires this new electronic device to be configured with configuration parameters particular to the network. Typically, the configuration parameters necessary for connecting to a wireless access point of a so-called Wi-Fi network are the name of the network (or SSID, standing for "service set identifier"), a type of encryption used and an encryption key, for example a so-called WPA or WPA2 key (standing for "Wi-Fi protected access"). It should be noted that such a network does not exclude the possibility that the electronic devices may connect to the network via cabled connections, for example via connections of the Ethernet type.

Various methods for configuring a new client electronic device wishing to connect via a wireless connection exist. The client electronic device may comprise a graphical interface enabling configuration parameters to be entered by a user. This method is tedious for the user, who in addition does not necessarily know the necessary parameters, and constraining for the client electronic device, which must comprise an entry and display device. Methods that are more intuitive for the users have been developed, such as the WPS (standing for "Wi-Fi protected setup") protocol. This WPS protocol does however oblige the user to press buttons on the electronic device and/or an access point of the network or to enter a code. This protocol is not adapted in the case of an inaccessible access point, and remains complicated for an unskilled user. It should also be noted that this WPS protocol has been the subject of several security breaches. Other solutions exist, for example with the use of NFC (standing for "near field communication") or RFID (standing for "radio frequency identification") tags, these solutions then requiring the integration of compatible readers in the electronic devices of the network, which complicates the design of these electronic devices and increases the cost thereof for ultimately a functionality that is little used.

It is therefore necessary to propose a method for overcoming these drawbacks, in particular by limiting to the maximum the actions or movements of a potentially unskilled user.

DISCLOSURE OF THE INVENTION

The invention relates to a method for automatically configuring a first electronic device to connect to a wireless access point of a communication network, the first electronic device comprising a network module, adapted for receiving and sending so-called network messages over the communication network, and being adapted for receiving and sending an audio signal, the method comprising the following steps performed by a second electronic device connected to the communication network via a network module and being adapted for receiving an audio signal, of:

receiving a first audio message coming from the first electronic device, determining whether this first audio message corresponds to a first predetermined keyword, if so, sending a first network message, the first network message comprising an indication of detection of the first keyword, an indication of quality of reception associated with the first audio message and an identifier of the second electronic device, then receiving a third audio message coming from the first electronic device, determining whether this third audio message corresponds to a third predetermined keyword, if so, sending a second network message, the second network message comprising an indication of detection of the third keyword, an indication of quality of reception associated with the third audio message and an identifier of the second electronic device, and the following steps, performed by a third electronic device connected to the communication network via a network module and being adapted for sending an audio signal, of:

receiving at least the first network message via the communication network, recording in a memory at least the data received in the first network message, determining, according to the data recorded in the memory, an ordered list of electronic devices connected to the communication network and adapted for sending an audio message, if the third electronic device is the first in the ordered list, then sending a second audio message comprising a second predetermined keyword and waiting for a first predetermined waiting time:

in the absence of reception of the second network message at the expiry of the first waiting time, sending a third network message indicating the non-reception of the second network message, or sending a fourth network message indicating the good reception of the second network message, otherwise, if reception of a network message indicating the non-reception of the second network message by the first electronic device in the ordered list or after expiry of a second predetermined waiting time, greater than the first waiting time, updating the ordered list by eliminating the first electronic device from the ordered list and returning to the preceding step with the ordered list updated, if the third electronic device has received the second network message indicating that the second audio message has been received by the first electronic device, then sending a fourth audio message comprising configuration parameters for the first electronic device in order to connect to the communication network.

According to a complementary embodiment of the invention, the steps of the method are performed by the same electronic device adapted for receiving and sending an audio message.

According to a complementary embodiment of the invention, the first electronic device comprising a first network module adapted for connecting to the communication network and a second network module adapted for connecting to a fourth electronic device, the fourth electronic device comprising an audio transmitter and/or an audio receiver, the first electronic device is adapted for, once connected to the fourth electronic device, sending and/or receiving an audio message via the fourth electronic device.

The invention also relates to a method for automatically configuring an electronic device to connect to a wireless access point of a communication network, the electronic device comprising a radio module, adapted for connecting to the wireless access point of the communication network, and being adapted for receiving and sending an audio signal, the method comprising the following steps performed by the electronic device:

sending a first audio message comprising a first predetermined keyword,
receiving a second audio message,
determining whether this audio message corresponds to a second predetermined keyword,
if so, then sending a third audio message comprising a third predetermined keyword, and
receiving a fourth audio message comprising configuration parameters in order to connect to the wireless access point of the communication network,
configuring the radio module in order to connect to the wireless access point of the communication network.

The invention also relates to an electronic device comprising a network module for connecting to a communication network and an audio module adapted for receiving an audio signal, the electronic device being adapted for performing the steps of the method that is the object of the invention that are performed by the second electronic device.

The invention also relates to an electronic device comprising a network module for connecting to a communication network and an audio module adapted for sending an audio signal, the electronic device being adapted for performing the steps of the method that is the object of the invention that are performed by the third electronic device.

The invention also relates to an electronic device comprising a network module for connecting to a communication network and an audio module adapted for receiving and sending an audio signal, the electronic device being adapted for performing the steps of the method that are the object of the invention.

The invention also relates to an electronic device comprising a radio module for connecting to a wireless access point of a communication network and an audio module adapted for receiving and sending an audio signal, the electronic device being adapted for performing the steps of the method that is the object of the invention.

The invention also relates to a system for automatically configuring a first electronic device to connect to a wireless access point of a communication network, the first electronic device comprising a radio module, adapted for connecting to the wireless access point of the communication network, and being adapted for receiving and sending an audio signal, the system comprising at least:

an electronic device comprising a network module for connecting to a communication network and an audio module adapted for receiving an audio signal, the electronic device being adapted for performing the steps of the method that is the object of the invention performed by the second electronic device and an electronic device comprising a network module for connecting to a communication network and an audio module adapted for sending an audio signal, the electronic device being adapted for performing the steps of the method that is the object of the invention that are performed by the third electronic device connected to the communication network, or an electronic device comprising a network module for connecting to a communication network and an audio module adapted for receiving and sending an audio signal, the electronic device being adapted for performing the steps of the method that is the object of the invention connected to the communication network.

The invention also relates to a computer program that can be stored on a medium and/or downloaded from a communication network in order to be read by a processor of an electronic device of a communication network. This computer program comprises instructions for implementing all or some of the steps of the method for automatically configuring an electronic device, when said program is executed by the processor.

The invention also relates to an information storage medium or recording medium, which can be read by or is accessible to the electronic device of the communication network, the information storage medium or recording medium comprising such a computer program.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

The invention sets out to establish initially an audio communication channel between a new electronic device that is to be connected to a network and an electronic device that is already connected to the network. The configuration parameters of the network, for connecting to a wireless access point, can then secondly be transmitted by this audio channel to the new electronic device, the latter then being able to configure itself correctly to connect to a wireless access point of the network. The invention can use a plurality of electronic devices connected to the network in order to "listen" to the new electronic device when the latter sends an audio message. Likewise, the invention makes it possible to select, among the plurality of electronic devices capable of sending an audio message to the new electronic device, the electronic device most adapted for this sending of the audio signal.

The invention relates to a method adapted to electronic devices conforming to an IEEE 802.11 standard.

Figure 1:
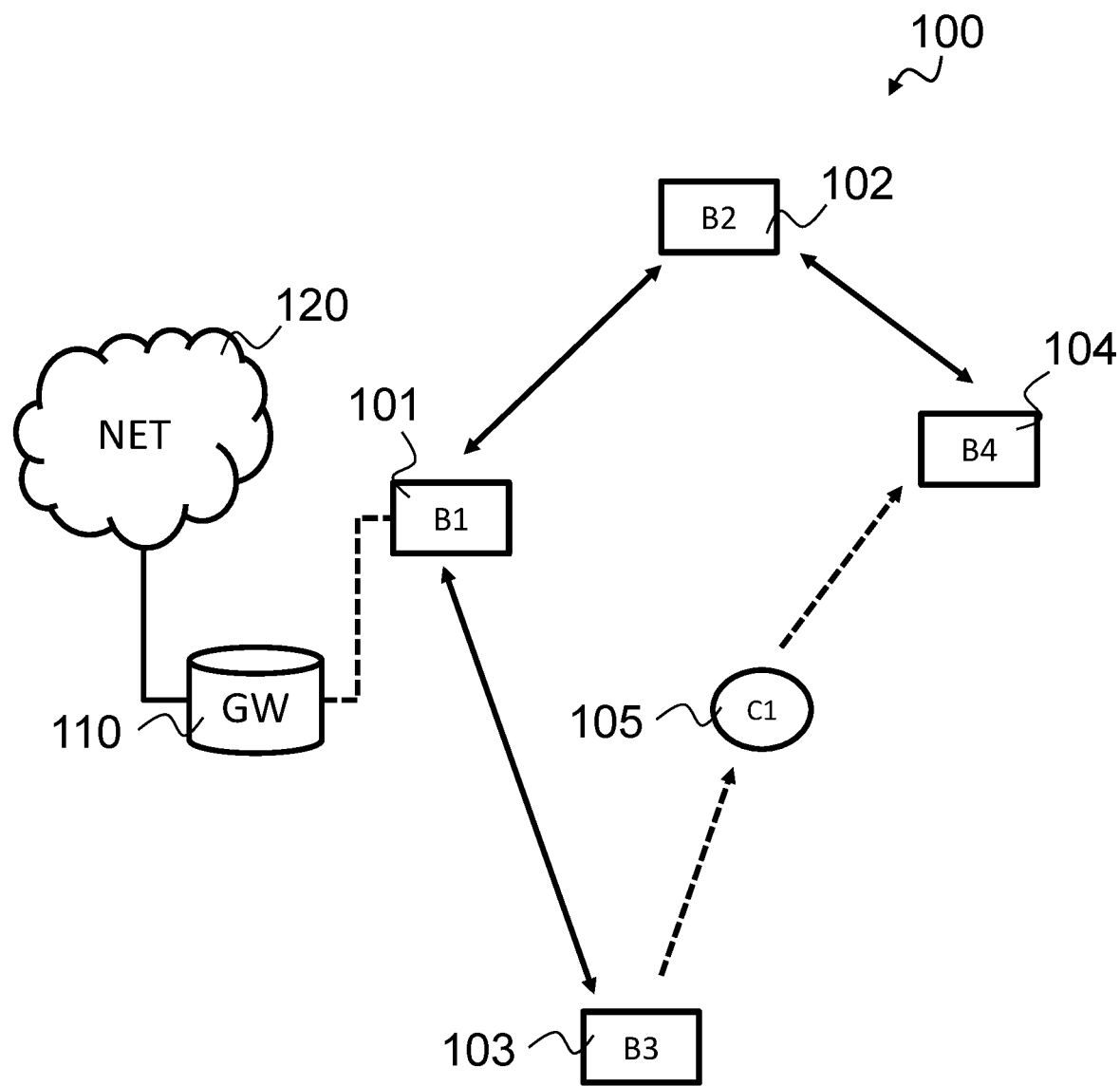
FIG. 1 illustrates schematically the architecture of a communication network comprising a plurality of electronic devices, wireless access points of which for example conform to an IEEE 802.11 standard.

FIG. 1 illustrates highly schematically a communication network 100, comprising at least one wireless access point, for example of the Wi-Fi or IEEE 802.11 type. The communication network 100 (herein "network 100") comprises a gateway 110 and a plurality of electronic devices B1 101, B2 102, B3 103, B4 104. The gateway 110 allows an interconnection of the network 100 with the network 120, for example the internet 120. In this example, the electronic devices B1, B2, B3 and B4 may be so-called gathering electronic devices. These nodes B1, B2, B3 and B4 then constitute a so-called gathering ("backhaul") infrastructure of the network 100. The electronic devices B1, B2, B3, B4 may also be wireless access points connected to the same gateway 110.

Each electronic device B1 101, B2 102, B3 103, B4 104 comprises a network module for connecting to the network 100. Typically, a network module is a radio module affording a wireless connection to the communication network, the radio module being for example compatible with a Wi-Fi or IEEE 802.11 standard. A network module may also be a so-called cabled network module, for example a network module of the Ethernet type. Thus, the network 100 may comprise electronic devices connected via a so-called Wi-Fi wireless connection, but also electronic devices connected via a cabled connection, for example Ethernet. An electronic device referred to as a wireless access point may comprise a first network module, of the wireless or cabled type, the first network module being adapted for connecting the electronic device to the communication network, and a second network module, of the wireless (or radio) type, in order to allow a connection of another electronic device via a wireless connection. Each electronic device B1 101, B2 102, B3 103, B4 104 may also comprise an audio module adapted for receiving and/or sending an audio signal. The hardware architecture of such an electronic device is described below in FIG. 3.

The electronic device C1 105 is an electronic device not yet configured for connecting to the network 100. The object of the invention is to propose a method for easily configuring this electronic device C1 105 so that it connects to a wireless access point of the network 100. The electronic device C1 105 comprises a radio module, adapted for—once configured—allowing a wireless connection to a wireless access point of the network 100. The electronic device C1 105 may comprise an audio module adapted for receiving and sending an audio signal.

Figure 2:
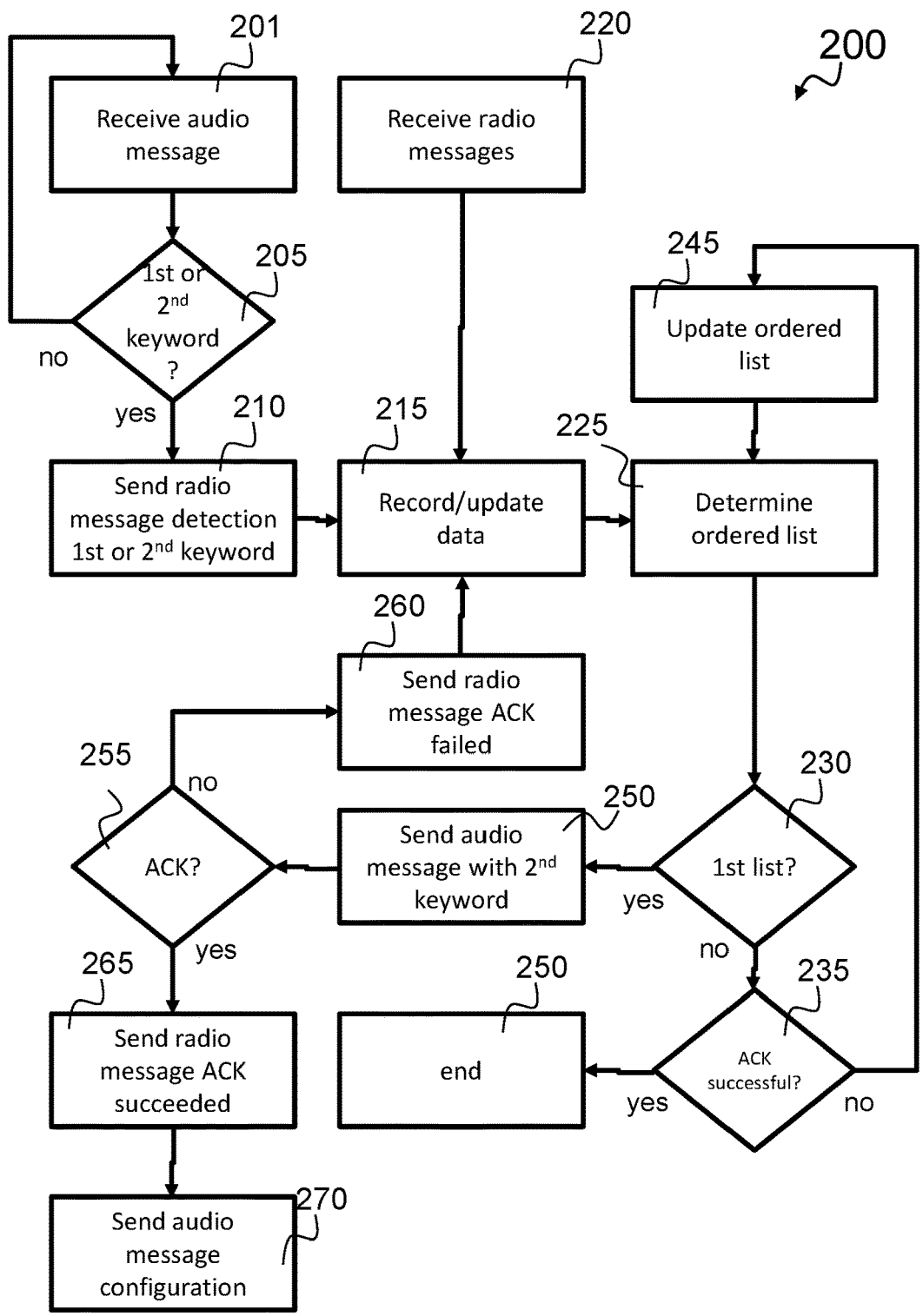
FIG. 2 illustrates schematically the main steps of a method for automatically configuring an electronic device to connect to a wireless access point of a communication network according to one embodiment of the invention.

FIG. 2 illustrates schematically the main steps of a method 200 for automatically configuring an electronic device C1 105 to connect to a wireless access point of the network 100 according to one embodiment of the invention.

The method 200 is performed by one or more electronic devices connected to the network 100, possibly all. Thus, each electronic device connected to the network 100 can perform all or some of the steps of the method 200. Each electronic device connected to the network 100 may be connected to this network 100 via a network module of the cabled or wireless type, for example a network module of the Wi-Fi type or a network module of the Ethernet type.

The method 200 is possibly performed periodically. The method 200 may advantageously be performed following an action of a user, for example pressing on a button of the electronic device connected to the network 100 or of an electronic device to be connected to the network 100. Alternatively, in a complementary fashion, the method 200 may be triggered by a predetermined event, for example, as described below, the detection, by an electronic device connected to the network 100, of a keyword in an audio signal received, such detection triggering the configuration method 200.

In a first step 201, an electronic device B1 101, B2 102, B3 103 or B4 104 of the network 100 comprising an audio module adapted for receiving an audio signal receives a first audio message, in the form of an audio signal. This audio signal is sent by the new electronic device C1 105 intended to be connected to a wireless access point of the network 100. Thus, a user can trigger the audio reading by the electronic device C1 105 of an audio signal to trigger the configuration method. The electronic device C1 105 comprises, in a memory, a first keyword, this first keyword is sent by the electronic device C1 105. It should be noted that this first keyword may correspond to any string of words. According to the embodiment of the invention, the audio signal sent may be sent on an audible frequency band, ultrasonic, or any other audio frequency band.

In a following step 205, the electronic device B1 101, B2 102, B3 103 or B4 104 of the network 100 determines whether this first audio message corresponds to the first predetermined keyword. Thus, the electronic device B1 101, B2 102, B3 103 or B4 104 has also recorded this first keyword in a memory. This first keyword may be particular to a manufacturer or to a network operator and be configured in advance in the electronic device B1 101, B2 102, B3 103 or B4 104 of the network 100 and in the electronic device C1 105. Alternatively, a user may manually configure the first keyword on one or other of the electronic devices. If during the step 205 it is determined that the first audio message does not comprise the first keyword, then the method 200 goes to the step 201 again. These steps 201 and 205 may correspond to a continuous process of listening by an electronic device. The electronic device B1 101, B2 102, B3 103 or B4 104 may implement known methods for detecting keywords in an audio signal.

If the first keyword is detected in the first audio message, then each electronic device connected to the network 100 that has detected this first keyword sends a first message, referred to as a network message, over the network 100, possibly intended for all the electronic devices connected, the first network message comprising an indication of detection of the first keyword, an indication of reception quality associated with the first audio message and an identifier of the second electronic device. If the electronic device is connected to the network 100 via a wireless network module, for example of the Wi-Fi type, then the network message is a radio message and the network module is a radio module. This first message may be in accordance with an exchange standard of the "zeroconf" type (a standard developed by the IETF, standing for "Internet Engineering Task Force"), of the "Bonjour" type (originally, implementation of the zeroconf standard by the company "Apple") or of the "mDNS" type (standing for "Multicast DNS", a protocol developed by the company "Apple"). According to one embodiment of the invention, each electronic device uses a software implementation of this protocol via the "Avahi" software library (or the "Bonjour" software library developed by "Apple"). Each electronic device can thus broadcast a first network message comprising an identifier of the electronic device, information on detection of the first keyword and an indication of reception quality of the first audio message. This quality indication may correspond to a reception power level of the audio message. In other words, this quality indication makes it possible to know whether the first audio message was received with a strong audio signal or a weak audio signal, which may be an indication of the proximity of the electronic device concerned to the electronic device C1 105.

Thus, in a parallel step 220, each electronic device B1 101, B2 102, B3 103 or B4 104 can receive a network message sent by one or more other electronic devices of the network 100, each network message likewise comprising an identifier of the electronic device that received the first audio signal, information on detection of the first keyword and an indication of quality of reception of the first audio message by said electronic device. Each message corresponds to a first network message sent by another electronic device connected to the network 100 that received the first audio message.

In a step 215, each electronic device B1 101, B2 102, B3 103 or B4 104 records in a memory the data of the first audio message received, and therefore sent in the first network message, but also the data received via network messages sent by other electronic devices that also detected an audio signal with the first keyword. This situation corresponds to an electronic device C1 105 sending an audio signal with the first keyword within range of a plurality of electronic devices connected to the network 100 and being adapted for receiving an audio signal.

In this step 215, each electronic device connected to the network 100 forms for itself a database comprising information on the electronic devices that received the first audio message (that is to say "heard" the electronic device C1 105 send the first keyword), as well as information on the quality of reception of said message. This database may correspond to a known database as defined by the aforementioned protocol, the known database being enhanced by data or information relating to the reception and detection of the first keyword by each electronic device connected.

In a following step 225, each electronic device determines, according to the data recorded in the memory, in particular during the step 215, an ordered list of electronic devices connected to the communication network and adapted for sending an audio message.

According to one embodiment of the invention, the ordered list is formed thus:
  only the electronic devices being adapted for sending an audio message are included in the ordered list,
  the electronic devices that received the first audio message constitute the first part of the list, the electronic devices that did not receive the first audio message constitute the second part of the list,
  the first part of the list is ordered according to the indicator of quality of reception of the first audio message, the first element of the list therefore being the electronic device that received the first audio message with the best quality,
  the second part of the list is ordered according to an arbitrary criterion, for example an alphabetic classification of an MAC (standing for media access control) address of each electronic device or of the identifier.

Thus, during this step 225, the electronic devices connected to the network 100 and able to send an audio message to the electronic device C1 105 are ordered from the most liable to be received by the electronic device C1 105 to the least liable to be so received.

According to the embodiment of the invention, the method may be distributed, each electronic device connected to the network 100 managing its own database, each database being supposed to be identical. According to another embodiment of the invention, the method may be centralised, an electronic device connected to the network being selected to manage a database and to control the other electronic devices of the network 100.

In a step 230, if the electronic device connected to the network 100 and performing the method 200 is the one classified in the first position in the ordered list, then, in a step 250, this sends a second audio message comprising a second predetermined keyword. The electronic device next waits, for a first predetermined waiting time, for any confirmation of response from the electronic device C1 105. It should be noted that the electronic device that sent the audio message during this step 230 is not necessarily adapted for receiving an audio message, and the response audio message from the electronic device C1 105 may therefore be received by another electronic device connected to the network 100, the latter electronic device next broadcasting in the network 100 a network message comprising the information on reception of the audio response from the electronic device C1 105.

In a step 255, the electronic device that sent the second audio message receives a second network message indicating good reception by the electronic device C1 105 of the second audio message. This second network message is sent by each electronic device connected to the network 100 that received the response from the electronic device C1 105, on the assumption that this electronic device C1 105 has indeed received the second audio message and responded by the sending of a third audio message (or audio acknowledgement). It should be noted that each audio message may comprise a keyword, a keyword that is predetermined and shared, in a similar manner to the first keyword as described above. By receiving an audio message, it is therefore possible to comprise receiving and detecting a keyword included in the audio message as described in the steps 201 and 205. Similarly, at each reception and detection of a keyword, each electronic device sends a network message, as in the step 210, in order to broadcast the reception information. Each electronic device can therefore update its database (step 215 performed continuously according to the reception of the network messages comprising pertinent information concerning the reception of audio messages).

Thus, in a step 201, the electronic device C1 105 sends a first audio message comprising a keyword, the audio message being received by at least one electronic device connected to the network and this keyword being detected. The information, after broadcasting in the network 100, makes it possible, in a step 225, to select the electronic device that is the best candidate for sending an audio message in return to the electronic device C1 105. The latter confirms, by the sending of a third audio message, good reception of the second audio message, the audio channel between the electronic device C1 105 and the plurality of electronic devices connected to the network 100 is established. It should be noted that, in a step 265, the electronic device that sent the audio message during the step 250 and next received confirmation of good reception thereof during the step 255, sends a network message to the other electronic devices connected to the network 100 in order to warn them that the audio channel is established and that it is no longer necessary to continue to attempt to establish this audio channel. In other words, once this message is broadcast, no other electronic device connected to the network 100 attempts to send a second audio message.

The audio channel being established, in a step 270 the electronic device connected to the network 100 can send one or more audio messages comprising configuration information (for example an SSID and a password both corresponding to a wireless access point of the network 100) to the electronic device C1 105. Possibly these messages are encrypted or signed. A shared encryption key may be defined in advance in each electronic device, for example by the manufacturer or an operator of the network 100.

Once configured, the electronic device C1 105 can connect to a wireless access point of the network 100. According to one embodiment of the invention, the electronic device C1 105, once connected to a wireless access point of the network 100, sends a network message indicating that the configuration has succeeded, thus ending the method 200. According to a complementary embodiment, the electronic device C1 105, once configured, sends an audio message indicating that the configuration method has indeed succeeded. Thus, a user of the electronic device C1 105 is informed that the configuration method 200 has been correctly implemented. Once connected to a wireless access point of the network 100, the electronic device C1 105 can perform the steps of the method 200 in order possibly to contribute to the configuration of a new client electronic device to be connected to the network 100.

During the step 230, the electronic device selected, i.e. the first in the ordered list, sends the second audio message comprising a second predetermined keyword and waits for a first predetermined waiting time (step 255), then:

in the absence of reception of the second network message when the first waiting time expires, sends (step 260) a third network message indicating the non-reception of the second network message, or sends (step 265) a fourth network message indicating the good reception of the second network message.

In other words, the electronic device selected for sending the second audio message, following the sending of this second audio message, waits, at a maximum for a time corresponding to the first predetermined waiting time, the reception of confirmation of good reception of the second audio message.

During the waiting time of the step 255, if it receives the confirmation of good reception of the second audio message by the electronic device C1 105 (either directly by receiving the third audio message if it is adapted for receiving an audio signal and detecting the third keyword, or indirectly, by a network message of reception by another electronic device connected to the network 100), then the electronic device connected to the network 100 sends a fourth network message (step 265) indicating the good reception of the second audio message by the electronic device C1 105.

Each electronic device not selected, that is to say all the electronic devices in the ordered list except for the first, in a step 235 receive this fourth network message of confirmation and for them the method 200 ends (step 250).

Conversely, if the electronic device connected to the network 100 that sent the second audio message does not receive any response when the first waiting time expires, then this electronic device sends a third radio message indicating non-reception of the second network message (step 260) and eliminates itself from the first position of the ordered list, the information being broadcast to all the electronic devices connected (step 215). A new ordered list is updated in a new step 225, and a new electronic device is selected for sending the second audio signal in a step 230.

Moreover, each electronic device not selected, i.e. all the electronic devices in the ordered list except for the first, in a step 235 receive the third network message of non-reception. These electronic devices then consider that the selection of the electronic device in the first position in the ordered list is not judicious. Each electronic device then goes to the step 245 again while eliminating the first electronic device from the ordered list. The steps 230 et seq are repeated until a response to the second audio message is received.

It should be noted that, during the step 255, in the case where the electronic device connected to the network 100 is adapted for both receiving and sending audio signals, and where it directly receives the second audio message sent by the electronic device C1 105, then the second network message is fictitious since it is exchanged within this same electronic device. The second network message is then an internal message, exchanged between software blocks (steps 201, 205 and 210 internal to the same electronic device).

The steps of the method 200 may be performed in parallel by a plurality of electronic devices connected to the network 100. The same electronic device adapted for receiving and sending radio signals may perform the steps of receiving an audio signal (steps 201, 205 and 210) or possibly of sending an audio signal (steps 230, 250, 255, 260, 265 and 270).

Figure 3:
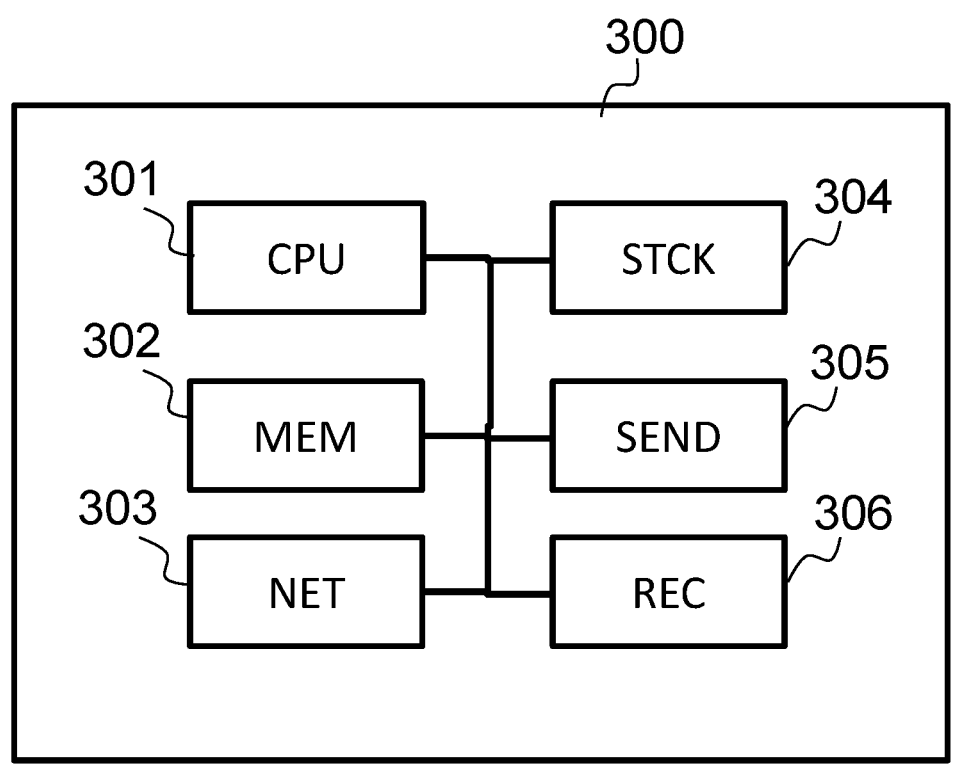
FIG. 3 illustrates schematically the hardware architecture of an electronic device of a communication network, the electronic device being adapted for performing all or some of the steps of the method for automatically configuring an electronic device to connect to a wireless access point of a communication network, according to an embodiment described below.

FIG. 3 illustrates schematically the hardware architecture of an electronic device B1 101, B2 102, B3 103, B4 104 of a communication device 100, the electronic device being adapted for performing all or some of the steps of the method 200 for automatically configuring an electronic device to connect to a wireless access point of a communication network, according to an embodiment described above.

Thus the electronic device 300 comprises, connected by a communication bus: a processor or CPU (central processing unit) 301; a memory MEM 302 of the RAM (random access memory) type and/or ROM (read only memory) type, a network module NET 303 of the radio or cabled type, adapted for connecting the electronic device 300 to the network 100, a storage module STCK 304 of the internal storage type and possibly a module 305 adapted for sending an audio signal and/or a module 306 adapted for receiving an audio signal. The electronic device 300 may further comprise a radio module (not shown), for example of the Wi-Fi type, this radio module being adapted for connecting an electronic device to the electronic device 300, and possibly to the network 100. It is then said that the electronic device 300 is a wireless access point. The storage module STCK 504 may be of the hard disk HDD (hard disk drive) or SSD (solid-state drive) type, or of the external storage medium reader type, such as an SD (Secure Digital) card reader, the reader comprising such an SD card. The processor CPU 301 can record data, or information, in the memory MEM 302 or in the storage module STCK 304. The processor CPU 301 can read data recorded in the memory MEM 302 or in the storage module STCK 304. These data may be configuration parameters. The network module NET 303 typically allows connection of the electronic device 300 to a wireless network of the Wi-Fi type or to a cabled network of the Ethernet type. The module 305 adapted for sending an audio signal may be a loudspeaker. The module 306 adapted for receiving an audio signal may be a microphone. The module 305 and the module 306 may be one and the same module adapted for sending and/or receiving.

The processor CPU 301 is capable of executing instructions loaded in the memory MEM 302, for example from the storage module STCK 304. When the electronic device 300 is powered up, the processor CPU 301 is capable of reading instructions from the memory MEM 302 and executing them. These instructions form a computer program causing the performance, by the processor CPU 301, of all or some of the methods and steps described above, particularly the method described in FIG. 2. Thus, all or some of the methods and steps described above can be implemented in software form by executing a set of instructions by a programmable machine, such as a DSP (digital signal processor) or a microcontroller. All or some of the methods and steps described here may also be implemented in hardware form by a machine or a dedicated component, such as an FPGA (field-programmable gate array) or an ASIC (application-specific integrated circuit). The functions of the electronic device 300 may be integrated in an electronic device of a wireless network conforming to an IEEE 802.11 standard by an updating of software, that is to say for example by updating the microprogram (firmware) of the electronic device 300.

The invention thus relates to an electronic device comprising a network module making it possible to connect to a communication network and an audio module adapted for receiving an audio signal, the electronic device being adapted for performing all or some of the steps of the method 200 described above.

The invention thus relates to an electronic device comprising a network module for connecting to a communication network and an audio module adapted for sending an audio signal, the electronic device being adapted for performing all or some of the steps of the method 200 described above.

The invention may also relate to an electronic device comprising a radio module for connecting to a wireless access point of a communication network and an audio module adapted for receiving and sending an audio signal, the electronic device being adapted for performing all or some of the steps of the method 200 described above.

The invention relates to a system for automatically configuring a first electronic device for connecting to a wireless access point of a communication network, the first electronic device comprising a radio module, adapted for connecting to the wireless access point of the communication network, and being adapted for receiving and sending an audio signal, the system comprising at least:
   an electronic device comprising a network module for connecting to a communication network and an audio module adapted for receiving an audio signal, the electronic device being adapted for performing all or some of the steps of the method 200 described above, and
   an electronic device comprising a network module for connecting to a communication network and an audio module adapted for sending an audio signal, the electronic device being adapted for performing all or some of the steps of the method 200 described above, or
   an electronic device comprising a radio module for connecting to a communication network and an audio module adapted for receiving and sending an audio signal, the electronic device being adapted for performing all or some of the steps of the method 200 described above.

The invention claimed is:

1. A method for automatically configuring a first electronic device to connect to a wireless access point of a communication network, the first electronic device comprising a network module adapted to connect the first electronic device to the communication network, adapted for receiving and sending so-called network messages over the communication network, and being adapted for receiving and sending an audio signal, the method comprising the following steps, performed by a second electronic device, connected to the communication network via a network module adapted to connect the second electronic device to the communication network and being adapted for receiving an audio signal, of:
   receiving a first audio message coming from the first electronic device,
   determining whether this first audio message corresponds to a first predetermined keyword,
   if so, sending a first network message, the first network message comprising an indication of detection of the first keyword, an indication of quality of reception associated with the first audio message and an identifier of the second electronic device, then
   receiving a third audio message coming from the first electronic device,
   determining whether this third audio message corresponds to a third predetermined keyword,
   if so, sending a second network message, the second network message comprising an indication of detection of the third keyword, an indication of quality of reception associated with the third audio message and an identifier of the second electronic device,
and the following steps, performed by a third electronic device connected to the communication network via a network module adapted to connect the third electronic device to the communication network and being adapted for sending an audio signal, of:
   receiving at least the first network message via the communication network,
   recording in a memory at least the data received in the first network message,
   determining, according to the data recorded in the memory, an ordered list of electronic devices connected to the communication network and adapted for sending an audio message,
   if the third electronic device is the first in the ordered list, then sending a second audio message comprising a second predetermined keyword and waiting for a first predetermined waiting time:
   in the absence of reception of the second network message at the expiry of the first waiting time, sending a third network message indicating the non-reception of the second network message, or
   sending a fourth network message indicating the good reception of the second network message,
   otherwise, if reception of a network message indicating the non-reception of the second network message by the first electronic device in the ordered list or after expiry of a second predetermined waiting time, greater than the first waiting time, updating the ordered list by eliminating the first electronic device from the ordered list and returning to the preceding step with the ordered list updated,
   if the third electronic device has received the second network message indicating that the second audio message has been received by the first electronic device, then sending a fourth audio message comprising configuration parameters for the first electronic device in order to connect to the communication network.

2. The method according to claim 1, the steps of the method being performed by the same electronic device adapted for receiving and sending an audio message.

3. The method according to claim 1, the first electronic device comprising a first network module adapted for connecting to the communication network and a second network module adapted for connecting to a fourth electronic device, the fourth electronic device comprising an audio transmitter and/or an audio receiver, the first electronic device is adapted for, once connected to the fourth electronic device, sending and/or receiving an audio message via the fourth electronic device.

4. A method for automatically configuring an electronic device to connect to a wireless access point of a communication network, the electronic device comprising a radio module, adapted for connecting to the wireless access point of the communication network, and being adapted for receiving and sending an audio signal, the method comprising the following steps performed by the electronic device:
- sending a first audio message comprising a first predetermined keyword,
- receiving a second audio message,
- determining whether this audio message corresponds to a second predetermined keyword,
- if so, then sending a third audio message comprising a third predetermined keyword, and
- receiving a fourth audio message comprising configuration parameters in order to connect to the wireless access point of the communication network,
- configuring the radio module in order to connect to the wireless access point of the communication network.

5. The electronic device comprising a network module for connecting to a communication network and a microphone adapted for receiving an audio signal, the electronic device being adapted for performing the steps of the method according to claim 1 that are performed by the second electronic device.

6. The electronic device comprising a network module for connecting to a communication network and a loudspeaker adapted for sending an audio signal, the electronic device being adapted for performing the steps of the method according to claim 1 that are performed by the third electronic device.

7. The electronic device comprising a network module for connecting to a communication network, a microphone adapted for receiving an audio signal and a loudspeaker adapted for sending an audio signal, the electronic device being adapted for performing the steps of the method according to claim 2.

8. The electronic device comprising a radio module for connecting to a wireless access point of a communication network, a microphone adapted for receiving an audio signal and a loudspeaker adapted for sending an audio signal, the electronic device being adapted for performing the steps of the method according to claim 4.

9. A system for automatically configuring a first electronic device to connect to a wireless access point of a communication network, the first electronic device comprising a radio module, adapted for connecting to the wireless access point of the communication network, and being adapted for receiving and sending an audio signal, the system comprising at least:
- an electronic device according to claim 5 and an electronic device according to claim 6 both 4 connected to the communication network; or
- an electronic device according to claim 7 connected to the communication network.

10. A non-transitory computer readable medium embodying a computer program comprising instructions for implementing, by a processor of an electronic device of a communication network, the method according to claim 1, when the computer program is executed by the processor.

11. A non-transitory recording medium that can be read by an electronic device of a communication network, on which a computer program is stored, the computer program comprising instructions for implementing, by a processor of the electronic device of the communication network, the method according to claim 4, when the computer program is executed by the processor.

* * * * *